US012613092B2

(12) United States Patent
Zettler et al.

(10) Patent No.: US 12,613,092 B2
(45) Date of Patent: Apr. 28, 2026

(54) METHOD AND APPARATUS FOR MEASURING THE THICKNESS OF A TRANSPARENT LAYER ON NANOMETER SCALE

(71) Applicant: LayTec AG, Berlin (DE)

(72) Inventors: Joerg-Thomas Zettler, Berlin (DE); Johannes Kristian Zettler, Berlin (DE)

(73) Assignee: LAYTEC AG, Berlin (DE)

( * ) Notice: Subject to any disclaimer, the term of this patent is extended or adjusted under 35 U.S.C. 154(b) by 236 days.

(21) Appl. No.: 18/223,889

(22) Filed: Jul. 19, 2023

(65) Prior Publication Data

US 2024/0027184 A1 Jan. 25, 2024

(30) Foreign Application Priority Data

Jul. 20, 2022 (EP) .................................... 22185997

(51) Int. Cl.
*G01B 11/06* (2006.01)
*C03C 15/00* (2006.01)
(52) U.S. Cl.
CPC .............. *G01B 11/06* (2013.01); *C03C 15/00* (2013.01)
(58) Field of Classification Search
None
See application file for complete search history.

(56) References Cited

U.S. PATENT DOCUMENTS 6,753,972 B1* 6/2004 Hirose ............... G01B 11/0625
356/504
2006/0082786 A1* 4/2006 Kim ................... G01B 11/0625
356/504

FOREIGN PATENT DOCUMENTS

CN 112629421 A * 4/2021 ........... G06F 16/901
JP 6309359 B2 10/2013

OTHER PUBLICATIONS

EP Search Report dated Jan. 3, 2023 in EP 22 185 997.8.

* cited by examiner

*Primary Examiner* — Andrew H Lam
(74) *Attorney, Agent, or Firm* — Fox Rothschild LLP

(57) ABSTRACT

The present invention relates to a method and an apparatus for measuring the thickness d of a transparent layer (10), and in particular to a method and an apparatus for measuring the thickness d of glass plates during wet-chemical glass thinning in the manufacturing process.

The method for measuring the thickness d of a transparent layer (10) includes: determining an approximate thickness $d_{FFT}$ based on a precisely known dispersion n(1) of the material of the layer (10) by performing Fast Fourier Transformation, FFT, analysis on Fabry-Pérot oscillation, FPO, from the layer (10) in a spectral reflectance measurement (900); and performing a FPO full-spectral fitting procedure (910-0) with the approximated thickness $d_{FFT}$ as starting value $d_{0,0}$ to determine an initial local best fitting thickness $d_{FPO,0}$. After the initial local best fitting thickness $d_{FPO,0}$ has been found, the FPO full-spectral fitting procedure (910-i) may be repeated with specific alternative starting values $d_{0,i}$ to determine a global best fitting thickness $d_{FPO}$.

9 Claims, 9 Drawing Sheets

METHOD AND APPARATUS FOR MEASURING THE THICKNESS OF A TRANSPARENT LAYER ON NANOMETER SCALE

BACKGROUND OF THE INVENTION

1. Field of the Invention

The present invention relates to a method and an apparatus for measuring the thickness of a transparent layer, and in particular to a method and an apparatus for measuring the thickness of glass plates during wet-chemical glass thinning in the manufacturing process. Metrology systems based on this invention are capable of determining, e.g., the thickness of glass plates, glass sheets, and glass foils in real-time during the manufacturing process with accuracy on the nanometer scale. Therefore, these metrology systems are specifically suited for end-point detection in related wet-etching processes. However, the method and apparatus are suitable to measure such thicknesses not only in wet-chemical etching processes but also in other environments like air, as it is necessary in particular in quality control for high-tech glass products and semiconductor wafers.

2. Description of Related Art

There is a wide range of products on the market for measuring glass plate thickness with several measurement techniques applied such as capacitive methods, laser-based triangulation, chromatic spectral reflectance and interferometric methods. From the currently applied methods for thickness measurements of glass sheets, the interferometric method in conjunction with advanced fast Fourier transform (FFT) algorithms is the most accurate one. For example, the "Optical NanoGauge" product of Hamamatsu Corp. claims a ±0.4% thickness accuracy with Fourier analysis of spectral reflectance of glass plates and semiconductor wafers.

Therefore, FIG. 1 illustrates the basic measurement and analysis steps of this prior art method. With an exemplary 100 μm thick optically transparent glass plate and a relative accuracy of ±0.4% according to the prior art, an absolute thickness accuracy of ±400 nm results. FIG. 1A compares the as-measured reflectance spectrum of such a 100 μm glass plate (black line) with an ideal simulation (grey line) in a broad spectral range. It can be seen that spectral broadening effects (due to 1.0 nm resolution of the spectrometer as well as the 2 degree optical aperture angle of the imaging system) superimpose an additional modulation and reduction of the FPO amplitudes to the experimental data. FIG. 1B explains how the abscissa axis has to be rescaled in order to prepare the data for FFT and FIG. 1C gives the FFT result. This rescaling of FIG. 1A to FIG. 1B is straightforwardly derived from well-known formulas that are based on the layer model sketched in FIG. 1D.

The reflectance spectrum of a parallel non-absorbing glass plate can be calculated according to $$R = \frac{2R_{01} + R_{01}\ 2\ \cos\left(\pi + 4\pi\ n(d/\lambda)\right)}{1 + R_{01}^2 + R_{01}\ 2\ \cos\left(\pi + 4\pi\ n(d/\lambda)\right)} \tag{1}$$

with surface reflectance $R_{01}$, wavelength $\lambda$ of the reflected light, and thickness d of the glass plate. The period of the cosine function is nonlinear and changes with $1/\lambda$. Therefore, a rescaling according to $$R(x) = \frac{2R_{01} + R_{01}\ 2\ \cos(\pi + 2\pi * x)}{1 + R_{01}^2 + R_{01}\ 2\ \cos(\pi + 2\pi * x)} \tag{2}$$

with $$x = \frac{2d\ n(\lambda)}{\lambda} \tag{3}$$

is introduced for enforcing the same period of the cosine function in the full range of parameter x. The refractive index n changes with $\lambda$ according to the dispersion $n(\lambda)$ of the layer material.

FIG. 2 shows an example why this standard prior art FFT method cannot perform with better accuracy. Three reflectance traces of three glass plates of different thicknesses have been calculated with Eq. (2) using simply a typical refractive index n=1.5 and are shown in the figure (thickness: 99.697 μm, 100.000 μm and 100.303 μm). All three reflectance traces are nearly identical and they are all dominated by Fabry-Perot oscillations (FPO). The FFT method measures the "frequency" of this FPO, hence, in particular, the peak-to-peak distance of two neighboring FPO minima. It is obvious that the three reflectance traces of these three differently thick glass plates are nearly identical. At a typical glass plate thickness d of 100.0 μm the spectral distance between two neighboring FPO minima in the 850 nm to 950 nm spectral range changes only by 0.03 nm per micrometer thickness change. In consequence, FFT-based thickness measurements typically are limited to an accuracy of approximately ±1 μm.

It is thus an object of the present invention to overcome or reduce at least some of the drawbacks of the prior art and to provide a method and apparatus for measuring the thickness of a thick transparent layer with an absolute accuracy of a few nanometers.

SUMMARY OF THE INVENTION

The invention solves the objective problem by providing a method for measuring the thickness of a transparent layer as defined in claim 1 and by providing a corresponding apparatus for measuring the thickness of a transparent layer as defined in claim 8.

An aspect of the present invention concerns a method for measuring the thickness d of a transparent layer including: determining an approximate thickness $d_{FFT}$ based on a precisely known dispersion $n(\lambda)$ of the material of the layer by performing Fast Fourier Transformation, FFT, analysis of Fabry-Perot oscillation, FPO, from the layer in a spectral reflectance measurement; and performing a FPO full-spectral fitting procedure with the approximated thickness $d_{FFT}$ as starting value $d_{0,0}$ to determine an initial local best fitting thickness $d_{FPO,0}$.

A transparent layer may be, for example, a glass or plastic plate, a semiconductor wafer or a transparent material film having a thickness d. The thickness d is the distance between the parallel upper and lower boundary planes of the transparent layer. The layer is considered transparent when thickness related FPO can be observed in a prior art spectral reflectance measurement for measuring the thickness d of the layer for at least one spectral range of the electromagnetic spectrum applicable for said reflectance measurement. The layer may be non-transparent for spectral ranges out of said reflectance measurement spectral range. Preferably, the reflectance measurement is a near infrared reflectance measurement with high spectral resolution. In particular, electromagnetic waves from a wavelength range between 800 nm to 900 nm may be applied for the reflectance measurement. However, the applied wavelength range may depend on the material of the transparent layer and/or the environment the sample is embedded in (e.g., an etching liquid). The transmission of the latter has to be sufficiently high in the wavelength range applied.

The method combines a prior art FFT analysis of FPO with a FPO full-spectral fitting procedure. The FFT analysis of FPO delivers the approximated thickness $d_{FFT}$ as starting value for the subsequent FPO full-spectral fitting procedure. The FPO full-spectral fitting procedure may be based on a regular prior art full reflectance FPO simulation of the transparent layer. As any fitting procedure applied to measured reflectance spectra, the FPO full-spectral fitting procedure minimizes the normalized distance between the measured spectrum and the fitted spectrum by adjusting the parameter to be measured. The fitting procedure thus includes modeling an FPO spectrum of the layer including the layer thickness d as fit parameter and minimizes a corresponding distance parameter S to the measured FPO spectrum $R_{exp}$ to determine an improved thickness estimation corresponding to a spectrum $R_{fitted}$ at the minimum of the distance parameter S.

Using FPO measured by spectral reflectance for determining the thickness d of a transparent layer as well as numerical and/or analytical modeling of an FPO spectrum of a transparent layer are known techniques of the prior art. Therefore, reference is only made to corresponding literature. However, combining both techniques in a method for measuring the thickness d of a thick transparent layer with nanometer accuracy provides a significant improvement over the prior art.

Preferably, the FPO full-spectral fitting procedure includes determining the thickness difference $\Delta d_{fit}$ between the initial local best fitting thickness $d_{FPO,0}$ and the approximate thickness $d_{FFT}$. The result of the FPO full-spectral fitting procedure strongly depends on the starting value. Thus, for different starting values $d_{FFT}$ the FPO full-spectral fitting procedure is typically not converging to a certain common value corresponding to the accurate thickness d. Instead, depending on the specific starting value, each optimization run may converge to a different local best fitting result. Therefore, performing the FPO full-spectral fitting procedure with the approximated thickness $d_{FFT}$ as starting value may only provide a local best fitting thickness $d_{FPO,0}$ estimate.

Preferably, the FPO full-spectral fitting procedure includes determining the thickness difference $\Delta d_{fit}$ between neighboring local best FPO fitting results. For this alternative definition of a thickness difference $\Delta d_{fit}$, it is helpful to introduce, based on Eqs. (2) and (3), an order number j for the reflectance minima. The order number j counts the multiples of full wavelength $\lambda$ in phase difference between reflectance at the front-side of the layer and the first back-reflection at the back-side of the layer. These integer numbers can be calculated from the wavelength minima in reflectance by $$\cos(\pi + x_{min} * 2\pi) = -1 \; x_{min} = j = 0, 1, 2, \ldots \; j = \frac{2nd}{\lambda_j^{min}} \tag{4}$$

According to Eq. (4), the thickness difference $\Delta d_{fit}$ between neighboring local best FPO fitting results (e.g. between the initial local best fitting thickness $d_{FPO,0}$ and a directly neighboring local best fitting thickness $d_{FPO,0}'$) can be estimated from the approximate thickness $d_{FFT}$ and the wavelength position $\lambda^{min}$ of a reflectance minimum in the center of the spectral range:

$$\Delta d_{fit} = \frac{\lambda^{min}}{2n} \tag{5}$$

Preferably, the method further includes repetitively performing the FPO full-spectral fitting procedure with $d_{0,i} = d_{FFT} \pm i * \Delta d_{fit}$. Hence, the starting value $d_{0,0}$ (corresponding to the approximate thickness $d_{FFT}$) is shifted by a limited set of integer multiples of the thickness difference $\Delta d_{fit}$ as alternative starting values $d_{0,i}$ to determine a global best fitting thickness $d_{FPO}$ ({$I$} may thus comprise a limited set of natural numbers without zero). More preferably, the method may further include repetitively performing the FPO full-spectral fitting procedure with the initial local best fitting thickness $d_{FPO,0}$ (obtained with the approximate thickness $d_{FFT}$ as starting value $d_{0,0}$) shifted by a limited set of integer multiples of the thickness difference $\Delta d_{fit}$ as alternative starting values $d_{0,i}$ (i.e. $d_{0,i} = d_{FPO,0} \pm i * \Delta d_{fit}$) to determine a global best fitting thickness dopo. The thickness difference $\Delta d_{fit}$ only depends on the refractive index n of the layer and the wavelength range used. Therefore, the fitting procedure and efficiency can be improved by repeating the FPO full-spectral fitting procedure several times but with the starting value shifted by integer multiples of the thickness difference, e.g. $\Delta d_{fit}$ ($\pm 1 * \Delta d_{fit}$, $\pm 2 * \Delta d_{fit}$, . . . ), for quickly finding the absolute global minimum of the related target function to the true and extremely accurate global best fitting thickness depo for the layer.

Preferably, a distance parameter S of the FPO full-spectral fitting procedure is the root-mean-square difference $S_{RMS}$ between all reflectance data points of the FPO from the layer in the spectral reflectance measurement and a corresponding FPO model using the measurement reflectance noise $\Delta R$ as a weighting factor $$S_{RMS} = \frac{1}{N-1} \sum_{i=1 \ldots N} \frac{R_{measured,i} - R_{fitted,i}}{\Delta R} \tag{6}$$

A FPO full-spectral fitting procedure usually starts at $S_{RMS} \sim 100$ and in the optimum case the fitting procedure ends at $S_{RMS} <= 1$, where the fitted spectrum is completely within the small uncertainty range of the measured reflectance spectrum's noise. Therefore, a converging repetition of the FPO full-spectral fitting procedure may be aborted when the fitted spectrum is completely within the uncertainty range of the measured reflectance spectrum noise. Due to a very sharp shape of the S($\Delta d$)-function close to the minima of $S_{RMS}$ (see, e.g., FIG. 6), always the $S_{RMS}$ minimum closest to the initial starting value $d_{FFT}$ is fitted. The uncertainty of the initial starting value $d_{FFT}$ (due to the statistical noise and poorer sensitivity of the FFT method) thus leads to multiple possible solutions of the FPO fitting procedure.

Preferably, the FPO full-spectral fitting procedure analyzes absolute wavelength positions of all FPO extreme values and assigns, acc. to Eq. (4), an order-number j to the FPO extreme values. The FPO spectrum can thus be ordered by a respective sequence of FPO minima $\lambda^{min}_j$ and maxima $\lambda^{max}_j$. However, FPO minima $\lambda^{min}_j$ are preferably analyzed.

The FPO full-spectral fitting procedure thus adds an FPO phase measurement by assigning the correct order-number j to each FPO maximum/minimum and subsequently deriving the thickness of the layer from the full spectral fit to the reflectance measurement spectra. It was found that sensitivity to layer thickness is weak for FPO-frequency (FFT analysis) but huge for the absolute position of, in particular, the FPO minima of the measured reflectance spectrum. However, reflectance noise due to detector and light-source intensity noise, as well as FPO frequency changes (due to limited absolute wavelength calibration accuracy and other effects caused by the imaging system) are hugely influencing the thickness accuracy of FFT analysis and therefore also the quality of the starting thickness $d_{FFT}$ for the subsequent FPO fitting procedure.

Preferably, for the spectral reflectance measurement a spectrometer system is applied and the spectral broadening of the spectrometer system as a function of wavelength $\Delta\lambda=f(\lambda)$ is taken into account for the method.

Preferably, for the spectral reflectance measurement a spectrometer system is applied and the spectrometer system is wavelength calibrated to an absolute wavelength accuracy better than 0.1 nm in the full wavelength range of the spectral reflectance measurement. The spectrometer system may be used as tunable high-resolution wavelength filter for a spectrally broad light source providing light for the reflectance measurement or it can be used for high-resolution analysis of the wavelength of an otherwise tunable narrow-band light source or laser after or before the reflectance measurement. An absolute wavelength accuracy better than 0.1 nm in the full wavelength range of the spectral reflectance measurement may be required to achieve nanometer resolution for the measurement method of the present invention.

Preferably, for the wavelength calibration the method is applied in sections of the full wavelength range of the spectral reflectance measurement to a reference layer having a known refractive index dispersion $n(\lambda)$ and thickness d. With such a defined reference layer, a wavelength calibration can be performed with highest precision over the full wavelength range of the spectral reflectance measurement and nanometer resolution for the measurement method of the present invention can be achieved.

Preferably, for the spectral reflectance measurement an imaging system is applied and a thickness offset $\Delta d_\varphi$ caused by the aperture angle of the imaging system is taken into account for the method. For high accuracy fitting procedures, the FPO broadening due to the optical aperture angle of the measurement light has to be taken into account by appropriate broadening algorithms in the method.

Focusing the light in the imaging system is a must for low noise reflectance measurements. This, however, causes thickness offsets $\Delta d_\varphi$ in the FFT and FPO fitting process. For non-normal incidence Eq. (1) has to be corrected as $$R = \frac{2R_{01} + R_{01} \; 2 \; \cos(\pi + 4\pi \; n(d/\lambda) * \cos(\varphi_{glass}))}{1 + R_{01}^2 + R_{01} \; 2 \; \cos(\pi + 4\pi \; n(d/\lambda) * \cos(\varphi_{glass}))} \quad (7)$$

$\varphi_{glass}$ can be easily calculated from the refractive index n and the averaged angle of incidence $\varphi_{ave}$, wherein $\varphi_{ave}$ is the averaged value within the range between $\varphi=0$ (perfect normal incidence) and $\varphi_{aperture}$ (optical aperture angle depending on the design of the imaging system). $\varphi_{glass}$ causes a failure in thickness measurement such that $d_{eff}$ is measured instead of d, with $d_{eff}=d*\cos(\varphi_{glass})$. Hence, this offset is corrected by measuring or calculating $\varphi_{glass}$ or $\Delta d_\varphi$, respectively.

Another aspect of the present invention concerns an apparatus for measuring the thickness d of a transparent layer. The apparatus comprises a light source; an imaging system; a high-spectral resolution photo-array-detector (spectrometer system), all together configured for spectral reflectance measurements on the layer; and an electronic device, configured to perform a method according to the present invention on detected reflectance measurement data.

A high intensity low-noise light source may be used as the light source. However, the light source is preferably an LED or sLED, or a wideband light source with a corresponding tunable spectral band-pass filtering applied. On the spectrometer system, high precision wavelength calibration may be performed for highest measurement resolution. The variation of spectral resolution within the used spectral range may be taken into account by appropriate broadening algorithms in the fitting procedure.

The imaging system (e.g. comprising a microscope objective or a lens system) may include an optical head to irradiate and collect light over a certain range of incidence angles for focusing the light. However, this focusing causes FPO broadening due to the optical aperture angle of the measurement light, which may have to be taken into account by appropriate broadening algorithms in the fitting procedure. Furthermore, the thickness offset $\Delta d_\varphi$ caused by the aperture angle of the imaging system may have to be determined for the FFT and FPO fitting process by measuring or calculating $\varphi_{glass}$. The photodetector may be a low noise, high sensitivity detector for measuring the intensity oscillation of the interfering reflected light during the reflectance measurement. The photodetector may be provided separately or by the spectrometer system.

An electronic device may be a general means for performing a method according to the present invention on detected reflectance measurement data. On the electronic device a corresponding measurement software implementing the method of the present invention may be installed and run for performing a measurement process.

In summary, a method and apparatus for measuring the thickness of a transparent layer on nanometer scale are provided. For achieving a ±1 nm absolute accuracy in the thickness measurement, several improvements as compared to prior art may be implemented into the apparatus and method:

With increasing thickness of the transparent layer and due to the limited spectral resolution of spectrometer systems, the amplitude of reflectance FPO is reduces (amplitude damping due to spectral resolution). Hence, appropriate spectrographs of high resolution may be used in the apparatus. For high accuracy fitting procedures, also the variation of spectral resolution within the spectral range may be taken into account by appropriate broadening algorithms in the simulation software.

For low-noise measurements, high intensity low-noise light-sources may be used and the imaging system may irradiate and collect light over a certain range of incidence angles (e.g., over an optical aperture angle of typically 0-2 degree).

Even this small opening angle of the detection optics, as it is necessary for low-noise reflectance measurements, causes additional damping of the FPO amplitudes. Hence, for high accuracy fitting procedures, also the FPO broadening due to the optical aperture angle of the measurement light may be taken into account by appropriate broadening algorithms in the simulation software.

The dispersion of the glass $n(\lambda)$ has to be determined with very high accuracy.

High-accuracy wavelength calibration of the spectrometer system may be performed.

Focusing the light in the imaging system is a must for performing low noise reflectance measurements. This, however, causes thickness offsets in the FFT and FPO fitting process, which may have to be corrected by a thickness offset $\Delta d_\varphi$ caused by the aperture angle of the imaging system, or taken into account in the simulation software.

The method of the present invention in particular allows to measure the absolute thickness d of suitable material layers (up to $10^6$ nm) by a non-contact method with accuracy in the ±1 nm range. The method may thus be applied for a multitude of measuring tasks. Thus, the uniformity of etching depth $\Delta d$ of large etch segments with ±2 nm accuracy may be measured. The accuracy of total thickness variations (TTV) of semiconductor wafers could be tremendously improved from typically ~100 nm to ±1 nm. Another example is measuring the thickness da of thick, absorbing (e.g., metal) sheets in transparent environment between a parallel reflecting plane and semi-transparent surfaces with ±3 nm absolute accuracy.

Therefore, all or some of said corrections may have to be taken into account in the simulation software for measuring the thickness of a transparent layer down to nanometer scale. Preferably, all reflectance signal deformations in the reflectance measurement, like FPO broadening (shrinking amplitude), reflectance noise and FPO frequency change, may have to be reduced to the physical limits by proper selection and set-up of the apparatus. All remaining signatures in the reflectance measurement due to signal integration over $\lambda$, $\phi$ and $n*d$ may be implemented into the optical model for best fitting results.

The FFT analysis method may be driven to its accuracy limits by combining high resolution spectrometers with corrections for Nyquist limitations and refractive index dispersion and by removing the spectrometer's remaining non-linearity in wavelength accuracy by calibration with a highly parallel reference layer of known absolute thickness and dispersion.

A significantly improved FFT thickness result yields FPO ordinal numbers and a sufficiently good starting value $d_{0,0}$ for a subsequent optical thickness fit: The real layer thickness d with ±1 nm resolution may result from spectral reflectance curve fitting to the measured FPO (preferably taking into account non-idealities such as lens focusing effects and the spectrometer's limited spectral resolution). Thus, a FPO phase measurement may be performed by assigning the correct ordinal number j to each FPO maximum/minimum and the thickness d of the transparent layer from the full spectral fit to the measured spectra may be subsequently derived.

Further preferred embodiments of the invention result from features mentioned in the dependent claims.

The various embodiments of the invention mentioned in this application can be combined with each other to advantage, unless otherwise specified in the particular case.

BRIEF DESCRIPTION OF THE FIGURES

In the following detailed description, only certain exemplary embodiments of the present invention are shown and described, by way of illustration. As those skilled in the art would recognize, the invention may be embodied in many different forms and should not be construed as being limited to the embodiments set forth herein. The figures show.

DETAILED DESCRIPTION OF THE FIGURES

Reference will now be made in detail to embodiments, examples of which are illustrated in the accompanying drawings. Effects and features of the exemplary embodiments, and implementation methods thereof will be described with reference to the accompanying drawings. As used herein, the term "and/or" includes any and all combinations of one or more of the associated listed items. Further, the use of "may" when describing embodiments of the present invention refers to "one or more embodiments of the present invention."

In the following description of embodiments of the present invention, the terms in a singular form may encompass plural forms unless the context clearly indicates otherwise.

It will be further understood that the terms "include", "comprise", "including", or "comprising" specify a property, a region, a fixed number, a step, a process, an element, a component, and a combination thereof but do not exclude other properties, regions, fixed numbers, steps, processes, elements, components, and combinations thereof.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "comprises", "comprising", "includes", and "including", when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
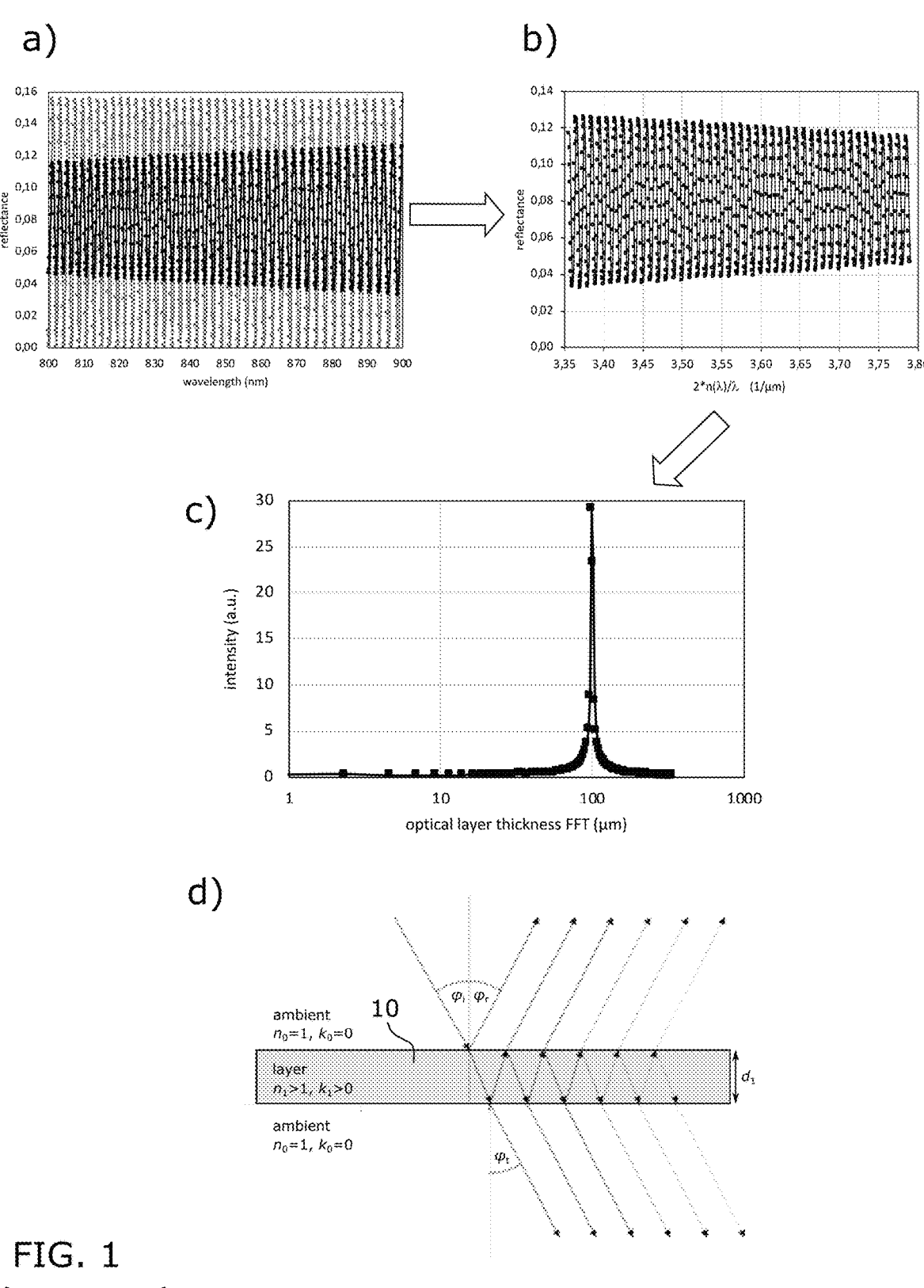
FIG. 1 an illustration of the basic measurement and analysis steps of a prior art measurement method.

FIG. 1 shows an illustration of the basic measurement and analysis steps of a prior art measurement method. A detailed description of the figure is presented in the description of related art.

Figure 2:
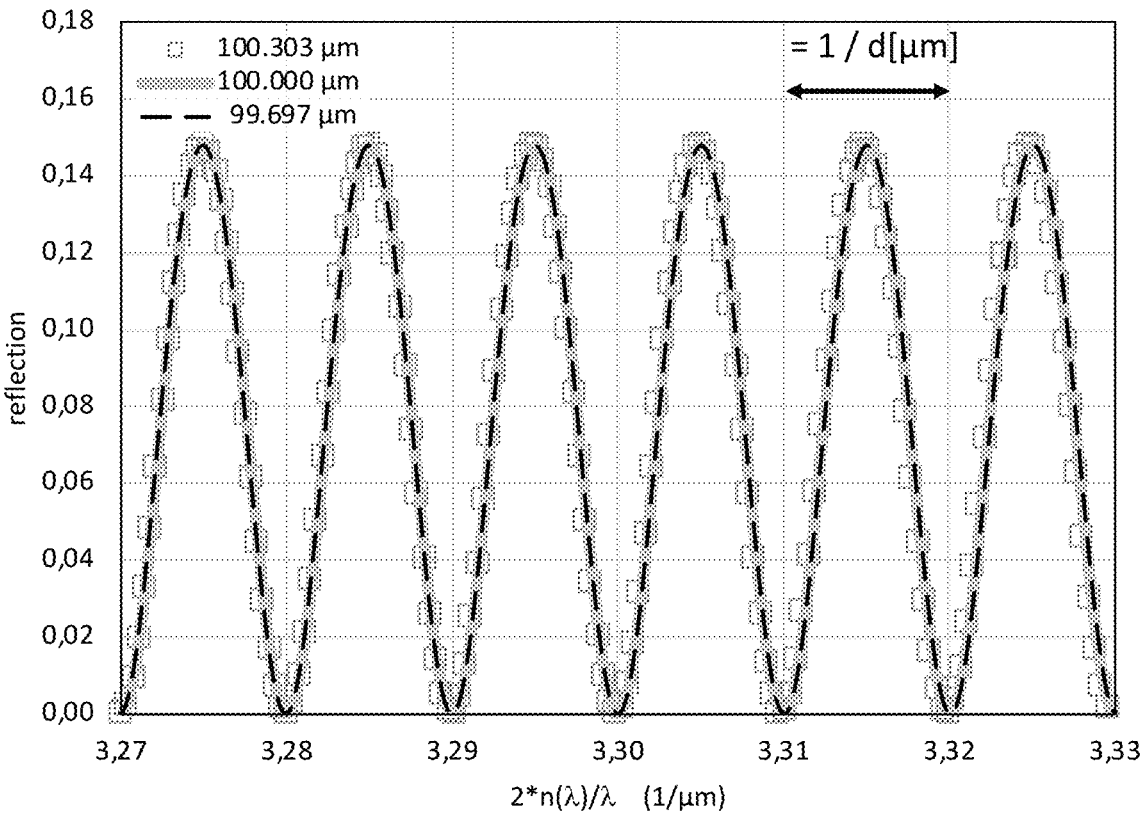
FIG. 2 an example why the prior art standard FFT method cannot perform with better accuracy.

FIG. 2 shows an example why the prior art standard FFT method cannot perform with better accuracy. A detailed description of the figure is as well presented in the description of related art.

Figure 3:
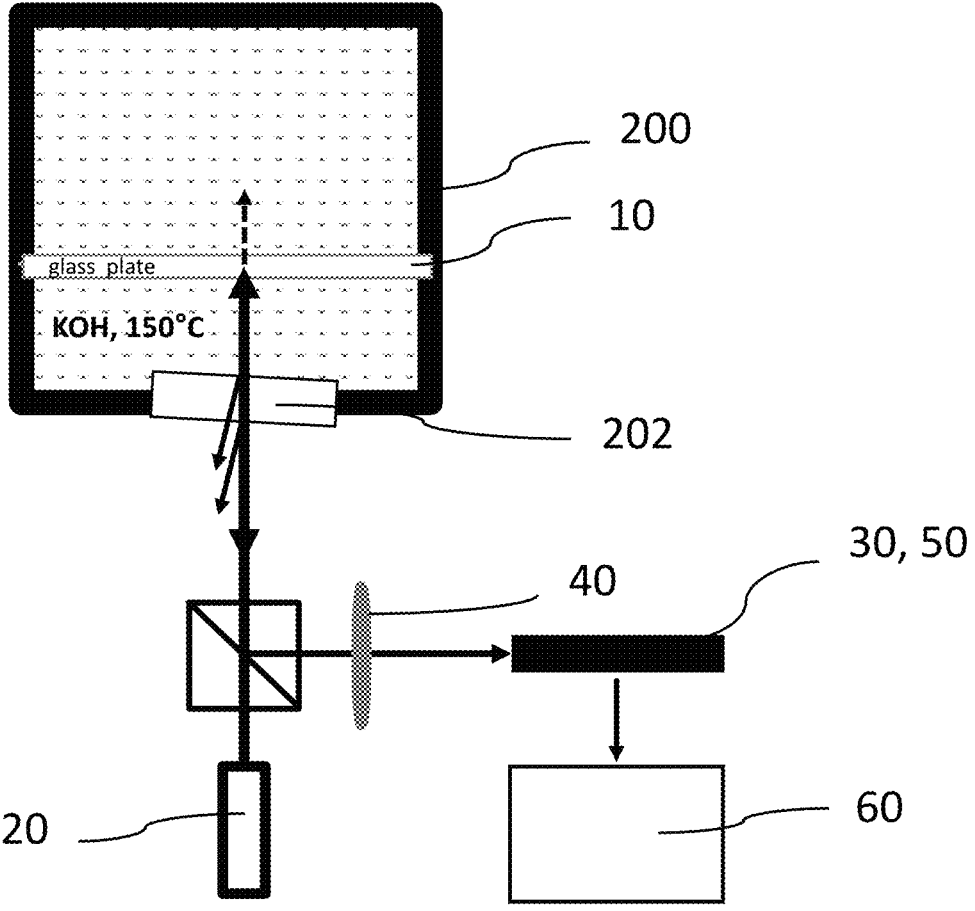
FIG. 3 a schematic illustration of a setup for in-situ measurement of glass plate thicknesses based on near infra-red interferometric reflectance measurements during wet-chemical glass thinning in a manufacturing process.

FIG. 3 shows a schematic illustration of a setup for in-situ measurement of glass plate thicknesses based on near infrared interferometric reflectance measurements during wet-chemical glass thinning in a manufacturing process. A glass plate as a transparent layer 10 is installed in a wet chemical etching chamber 200. The wavelength range for the reflectance measurement must be chosen according to the absorption properties of the used etching solvent. Typically, KOH/ $H_2O$-based etchants are sufficiently transparent in the 850 nm to 900 nm spectral range. The light for the reflectance measurement is coupled into the glass plate by a suitable window 202 of the etching chamber 200. The window 202 may be slightly tilted with respect to the beam axis to avoid perpendicular back reflections from the window interfering with the reflectance measurement signal. The window 202 must be KOH resistant.

Due to a permanent etching approach of the solvent, the thickness d of the glass plate is constantly reduced and may to be in-situ monitored with high resolution. The task is to measure the related change in glass plate thickness d with a thickness resolution of ±100 nm or better. The measurement method is performed by means of an apparatus for measuring the thickness d of a transparent layer 10 according to the present invention, comprising a light source 20; a spectrometer system 30; an imaging system 40; a photodetector 50, configured for spectral reflectance measurements on the layer 10; and an electronic device 60, configured to perform a method of the present invention on detected reflectance measurement data. The light source may be a near infrared laser emitting wavelengths around 880 nm which is driven below laser threshold.

Figure 4:
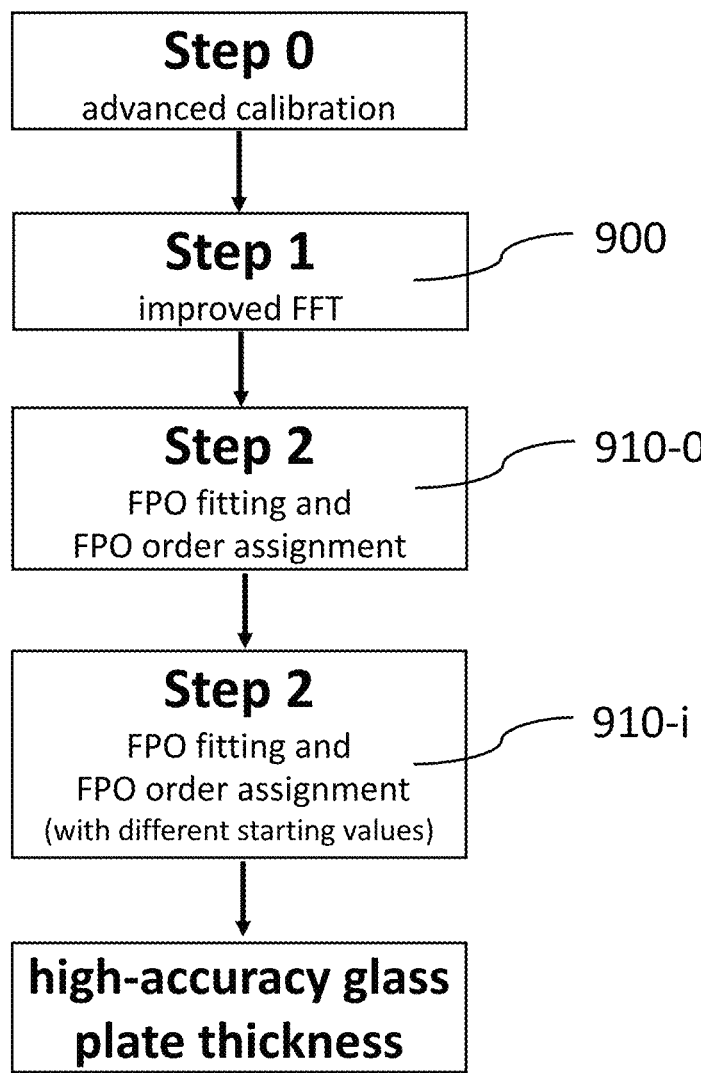
FIG. 4 a schematic illustration of an embodiment of a method according to the invention.

FIG. 4 shows a schematic illustration of an embodiment of a method according to the invention. In a zeroth step an advanced calibration may be performed. This may include at least one of a) determining the highly precise n(λ) dispersion of the material the transparent layer is made of; b) determining the spectral broadening of the spectrometer system as a function of wavelength $\Delta\lambda=f(\lambda)$; c) determining the apparent glass thickness offset $\Delta d_\varphi$ caused by the aperture angle of the imaging system 40; and d) improving the absolute wavelength accuracy better than 0.1 nm in the full wavelength range of the spectral reflectance measurement. An advanced calibration may be performed only once when first setting up a specific measurement environment or the corresponding parameters are already known. However, if the measurement setup is modified, at least one of said advanced calibration aspects may again be performed.

In a first step, a FFT analysis on FPO measured from the layer in a spectral reflectance measurement 900 is performed. Thereby, due to precisely known dispersion n(λ) of the material of the layer and, if required, a further advanced calibration, the FFT analysis on FPO measured from the layer in a spectral reflectance measurement 900 can be highly improved to provide an approximate thickness $d_{FFT}$ with higher precision as compared to prior art FFT methods.

In a second step, a FPO full-spectral fitting procedure 910-0 with the approximated thickness $d_{FFT}$ as starting value $d_{0,0}$ is performed to determine an initial local best fitting thickness $d_{FPO,0}$.

Further, FPO full-spectral fitting procedures 910-i with the approximate thickness $d_{FFT}$ (or alternatively $d_{FPO,0}$) shifted by a limited set of integer multiples of a thickness difference $\Delta d_{fit}$ it as alternative starting values $d_{0,i}$ may be performed to determine a global best fitting thickness $d_{FPO}$.

As result, the thickness d of a transparent layer (e.g. a glass plate) can be measured with highest precision on the nanometer scale up to ±0.0001% relative accuracy for typical thicknesses d between 1 μm and 1000 μm.

Figure 5:
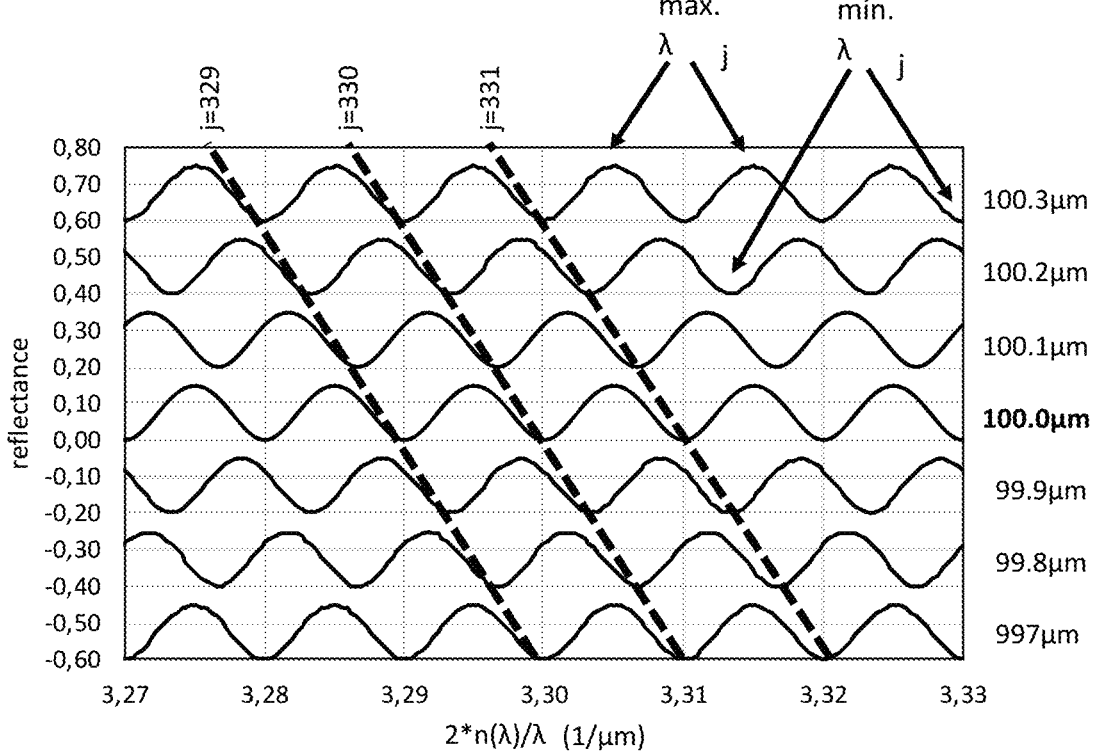
FIG. 5 a schematic illustration of a phase-sensitive reflectance measurement.

FIG. 5 shows a schematic illustration of a phase-sensitive reflectance measurement. It explains the main idea of the present invention: improvement of absolute accuracy for a prior art FFT thickness measurement method by more than two orders of magnitude due to a FPO spectral fit (step 2 in FIG. 4) performed subsequently to the FFT analysis (step 1 in FIG. 4). Only as an example, seven reflectance spectra have been calculated with Eq. (2) and a typical refractive index n=1.5 for a glass plate as transparent layer having different thicknesses d ranging between 99.7 μm and 100.3 μm. The three nearly identical spectra for 99.7 μm, 100.0 μm and 100.3 μm thickness (as already shown in FIG. 2) are also included. One can easily see that with increasing thickness d of the glass plate the FPO signatures continuously shift to smaller 2n(λ)/λ-values (i.e. to longer wavelengths). In this simulation, where the thickness d is known, it is straight forward to assign the related FPO ordinal number j to the FPO minima.

For a typical thickness d of a transparent layer with 100.0 μm, the spectral position of a FPO minimum position in the 850 nm to 950 nm near infrared spectral range changes only 10 nm per 1 μm change of the thickness d. This is a 300-fold higher sensitivity to the thickness d as compared to a prior art FFT method, because the spectral distance between two neighboring FPO minima (measured by FFT, see FIG. 1) in the 850 nm to 950 nm spectral range changes only by 0.03 nm per 1 μm change of the thickness d. Hence, a main idea of the present invention is to measure the thickness d of a transparent layer with a combined method: First, an approximate thickness $d_{FFT}$ is roughly determined by FFT analysis (900). Due to at least one sophisticated calibration step (step 0 in FIG. 4) the absolute accuracy of $d_{FFT}$ can be already significantly improved as compared to prior art. Then a regular full reflectance FPO simulation is performed starting with $d_{FFT}$ and improving it with a subsequent FPO full-spectral fitting procedure 910 to a significantly more accurate rate dopo.

Figure 6:
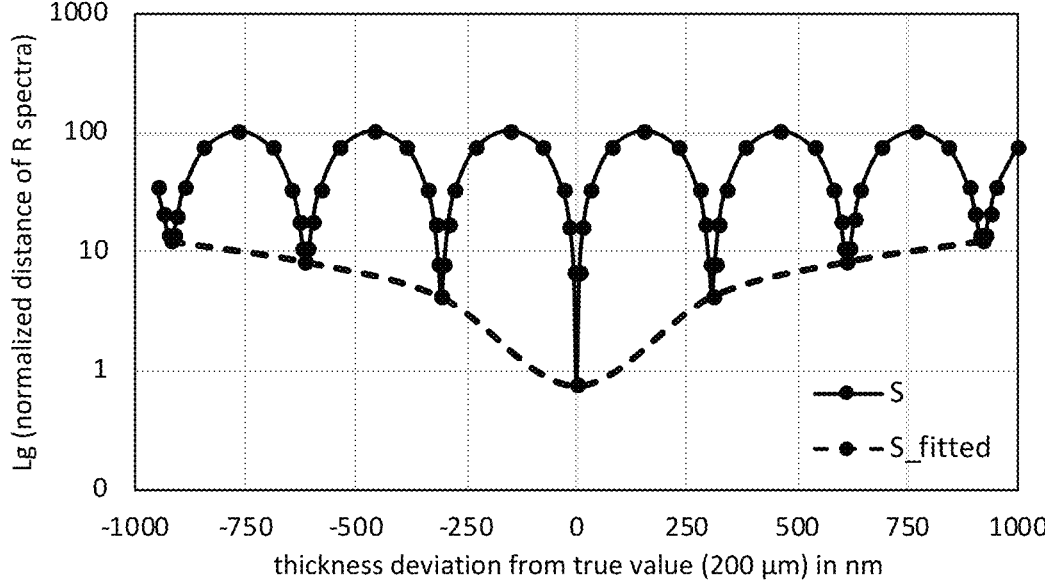
FIG. 6 an illustration of a typical optimization behavior of FPO full-spectral fitting procedure.

FIG. 6 shows an illustration of a typical optimization behavior of FPO full-spectral fitting procedure 910. As already shown in FIG. 2, the reflectance spectra for several thicknesses d can look very similar. This effect is systematically demonstrated in FIG. 6 for a 200 μm thick glass plate as transparent layer. Any fitting procedure applied to reflectance spectra minimizes the normalized distance between the measured spectrum and the fitted spectrum by adjusting the parameter to be measured. A suitable distance parameter S (defined by a target function) is the root-mean-square difference $S_{RMS}$ between all reflectance data points (measured and fitted) using the measurement noise as a weighting factor (see Eq. 6).

A fit usually starts at $S_{RMS}=\sim100$ and in the best case the fitting procedure ends at $S_{RMS}<=\sim1$, where the fitted spectrum is completely within the small uncertainty range of the measured reflectance spectrum's noise. For calculating the graph shown in FIG. 6, first the reflectance spectrum of a 200 μm thick glass plate as transparent layer was calculated, superimposed with a 0.1% artificial reflectance noise and subsequently treated as "experimental spectrum" with a well-known thickness d of 200 μm. In a second step, assuming a ±500 nm uncertainty of the thickness after standard FFT analysis, the fitting procedure was started with very different starting values between 199 μm (−1 μm=− 1000 nm on the abscissa axis) and 201 μm (+1 μm=+1000 nm on the abscissa axis). Seven different very stable fit results have been determined (S-fitted curve). The absolute minimum in $S_{FPO}$ (best fit) was found, as expected, at thickness deviation zero (200.0 μm). In order to better understand these multiple fit results, in a third step, $S_{rms}$ for a larger number of thicknesses (solid line S) was also calculated. This completely explains the multiple solutions of the fitting procedure: wherever the initial starting value $d_{FFT}$ is positioned due to the statistical noise and poorer sensitivity of the FFT method, always the closest $S_{FPO}$ minimum is fitted due to the very sharp shape of the S(Δd)-function close to the S-minima.

The thickness difference $Δd_{fit}$ it of ~300 nm between the different local best fitting solution only depends on the refractive index n of the transparent layer and the wavelength range used. Therefore, in the present invention the fitting procedure may include an improved algorithm: after the first run, when a local fitting minimum is found rather close to $d_{FFT}$, the fitting is repeated several times (i times) with the starting value $R_i$ shifted by multiples (±1*$Δd_{fit}$, ±2*$Δd_{fit}$, . . . ) for quickly and efficiently finding the absolute minimum of $S_{FPO}$ related to the true and extremely accurate thickness d of the transparent layer.

Figure 7:
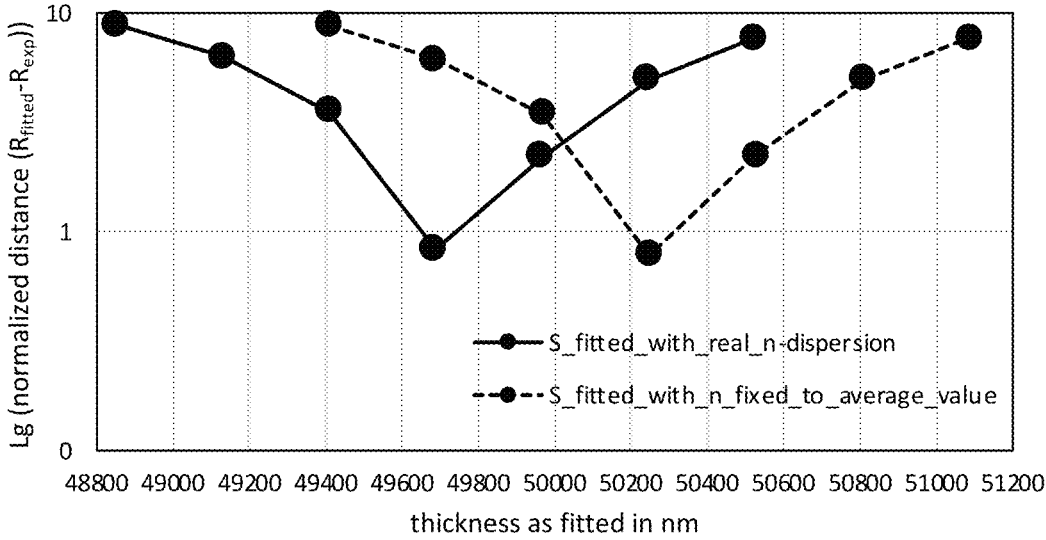
FIG. 7 an illustration of the influence of the dispersion $n(\lambda)$.

FIG. 7 shows an illustration of the influence of the dispersion n(λ). The dispersion n(λ) has to be determined with very high accuracy. This is demonstrated for a 50 mm thick glass plate (Schott glass D263Teco). Even in the narrow 800 nm to 900 nm wavelength range applied for the reflectance measurement (example measurement data is shown in FIG. 7), ignoring the small refractive index dispersion causes a systematic thickness offset error of some 300 nm.

Figure 8:
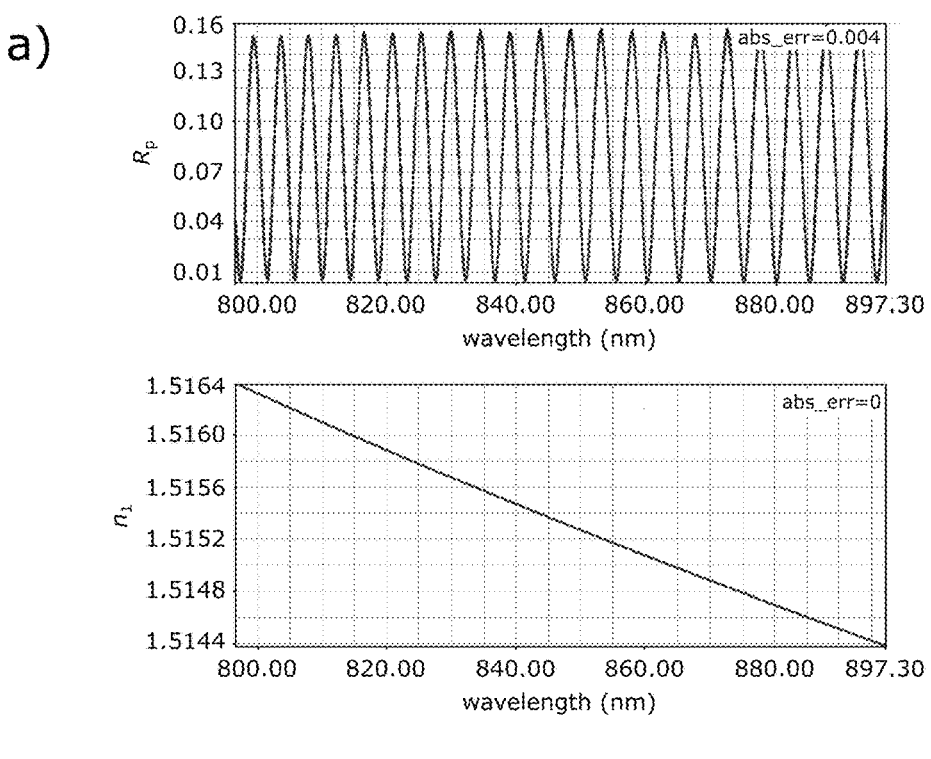
FIG. 8 an exemplary method of high-accuracy wavelength calibration of the spectrometer system.
Figure 8:
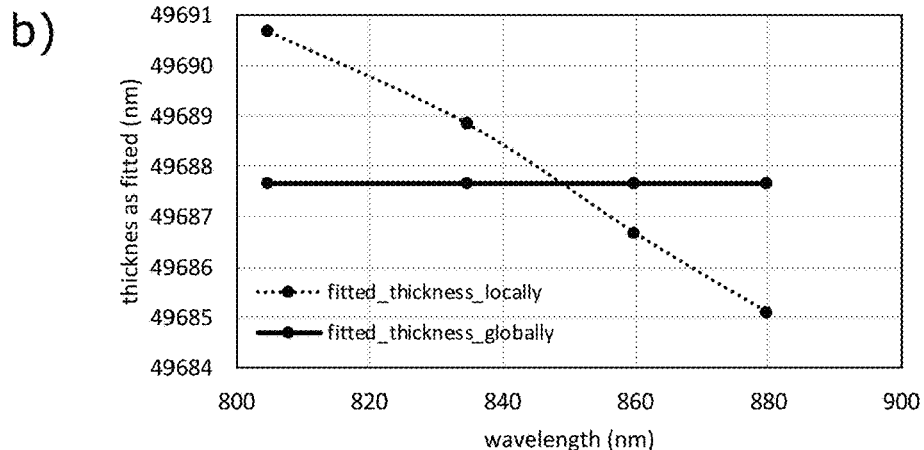
Figure 8:
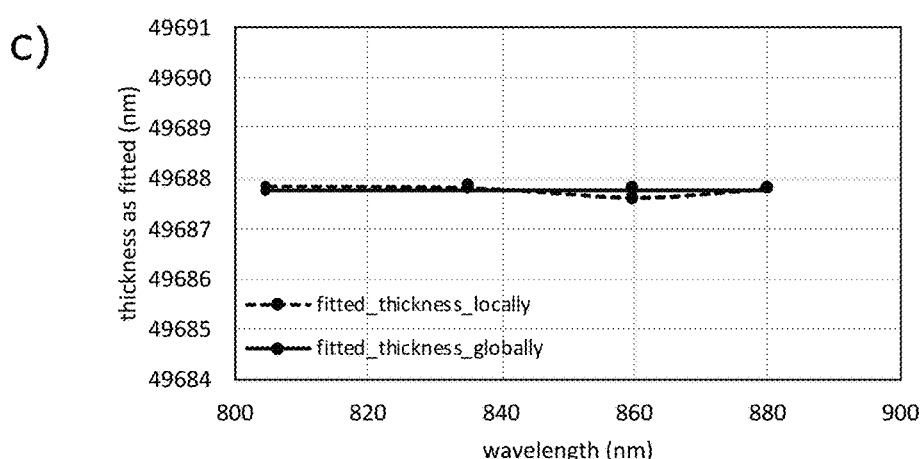

FIG. 8 shows an exemplary method of high-accuracy wavelength calibration of the spectrometer system. Prior art calibration with spectral lamps typically gives a ±0.1 nm accuracy of the spectrometer's wavelength scale. The wavelength calibration can be improved by applying the method of the present invention first to a reference layer having a known refractive index dispersion n(λ) and thickness d in sections of the full wavelength range of the spectral reflectance measurement. For example, a ~50 μm glass plate (Schott glass D263Teco) or another suitable transparent layer may be used for the calibration. In a first step, the full wavelength range for the reflectance measurement (e.g. wavelengths from 800 nm to 900 nm) is used to determine the thickness, using the well-known n(λ) refractive index dispersion of the Schott glass D263Teco. For high accuracy calibration of the linearity of the spectrometer's wavelength scale, the fit procedure may be repeated for sub-segments of the wavelength range (e.g. 805±10 nm, 835±10 nm, 860±10 nm and 880±10 nm).

Figure 9:
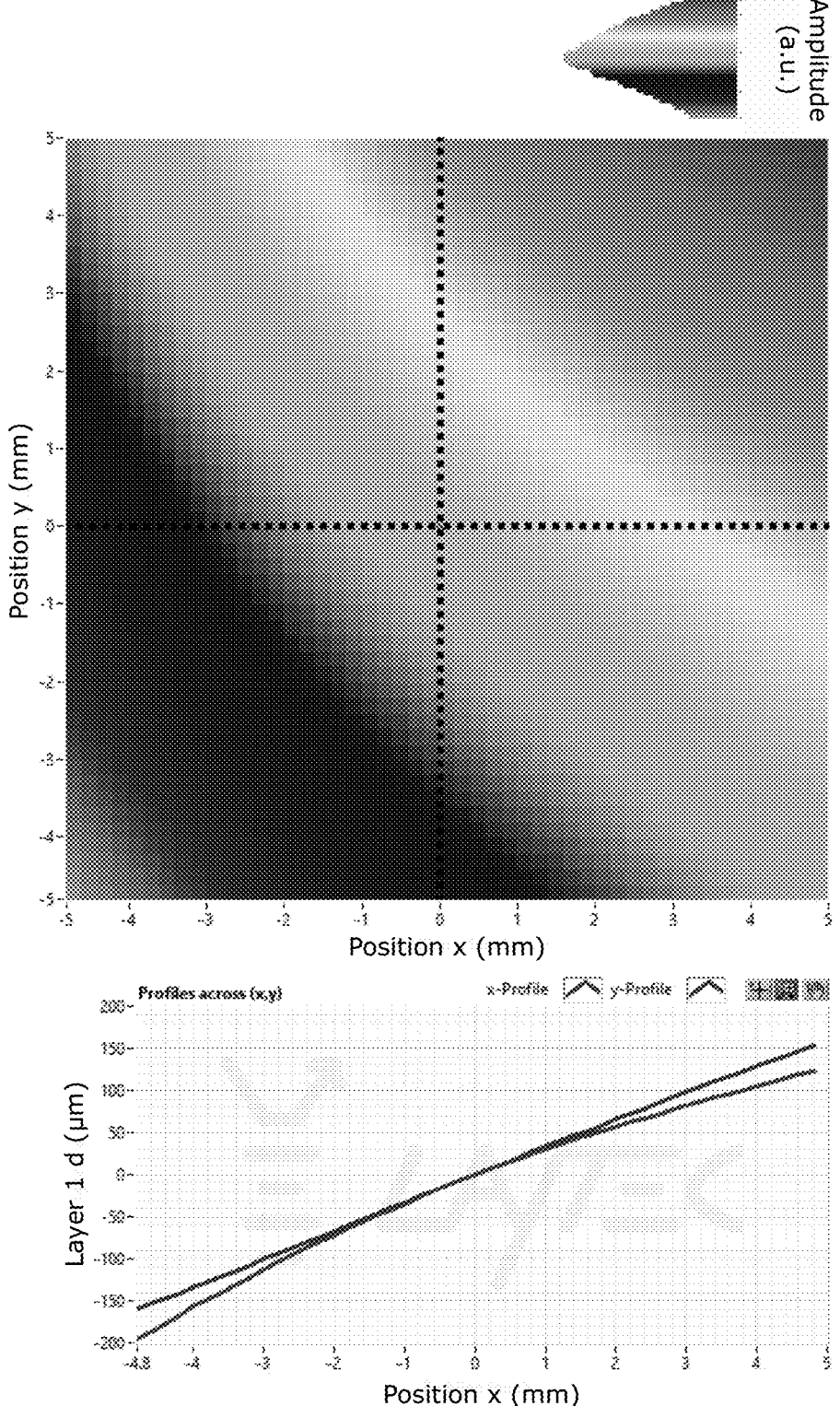
FIG. 9 an example for an application beyond thickness control in wet-etching.

FIG. 9 shows an example for an application beyond thickness control in wet-etching. A glass plate as transparent layer was placed in an x-y mapping stage and the thickness variation across the glass plate could be measured with nanometer resolution.

REFERENCE LIST

10 transparent layer
20 light source
30 spectrometer system
40 imaging system
50 photodetector
60 electronic device
100 apparatus
200 etching chamber
202 window
900 FFT analysis on FPO measured from the layer in a spectral reflectance measurement
910 FPO full-spectral fitting procedure
i number of a FPO full-spectral fitting procedure
j order-number of FPO extreme values
$λ^{min}_j$ extreme value (minimum)
$λ^{max}_j$ extreme value (maximum)
$d_{FFT}$ approximate thickness (based on FFT)
$d_{0,0/i}$ (alternative) starting value for FPO fitting
$d_{FPO,0}$ initial local best fitting thickness (based on FPO with $d_{FFT}$ as starting value $d_{0,0}$)
$d_{FPO,j}$ local best fitting thickness (based on FPO with starting value $d_{0,i}$)
$d_{FPO}$ global best fitting thickness (based on FPO)
$Δd_φ$ thickness offset (caused by the aperture angle of imaging system 40)
$Δd_{fit}$ thickness difference (between the initial local best fitting thickness $d_{FPO,0}$ and approximate thickness $d_{FFT}$ or between neighboring local best FPO fitting results)

What is claimed is:

1. A method for measuring the thickness d of a transparent layer, including:

determining, by an electronic device, an approximate thickness $d_{FFT}$ based on a precisely known dispersion n(λ) of a material of the layer by performing Fast Fourier Transformation, FFT, analysis on Fabry-Pérot oscillation, FPO, from the layer in a spectral reflectance measurement;

performing, by the electronic device, a FPO full-spectral fitting procedure with the approximated thickness $d_{FFT}$ as starting value $d_{0,0}$ to determine an initial local best fitting thickness $d_{FPO,0}$, wherein the FPO full-spectral fitting procedure includes determining the thickness difference $Δd_{fit}$ between the initial local best fitting thickness $d_{FPO,0}$ and the approximate thickness $d_{FFT}$, or between neighboring local best FPO fitting results;

wherein the method further includes:

repetitively performing the FPO full-spectral fitting procedure with the approximate thickness $d_{FFT}$ shifted by a limited set of integer multiples of the thickness difference $Δd_{fit}$ as alternative starting values $d_{0,i}$ to determine a global best fitting thickness $d_{FPO}$; or repetitively performing the FPO full-spectral fitting procedure with the initial local best fitting thickness $d_{FPO,0}$ shifted by a limited set of integer multiples of the thickness difference $Δd_{fit}$ as alternative starting values $d_{0,i}$ to determine a global best fitting thickness $d_{FPO}$.

2. The method according to claim 1, wherein a target function of the FPO full-spectral fitting procedure is the root-mean-square difference $S_{RMS}$ between all reflectance data points of the spectral reflectance measurement and a corresponding FPO model using the measurement noise as a weighting factor.

3. The method according to claim 1, wherein the FPO full-spectral fitting procedure analyzes absolute wavelength positions of all FPO extreme values and assigns an ordinal number j to the FPO extreme values.

4. The method according to claim 1, wherein for the spectral reflectance measurement a spectrometer system is applied and the spectral broadening of the spectrometer system as a function of wavelength $\Delta\lambda=f(\lambda)$ is used as a parameter of the method.

5. The method according to claim 1, wherein for the spectral reflectance measurement a spectrometer system is applied and the spectrometer system is wavelength calibrated to an absolute wavelength accuracy better than 0.1 nm in the full wavelength range of the spectral reflectance measurement.

6. The method according to claim 1, wherein for the wavelength calibration the method is applied in sections of the full wavelength range of the spectral reflectance measurement to a reference layer having a known refractive index dispersion $n(\lambda)$ and thickness d.

7. The method according to claim 1, wherein for the spectral reflectance measurement an imaging system is applied and the thickness offset $\Delta d_{\varphi}$ caused by the aperture angle of the imaging system is used as a parameter of the method.

8. An apparatus for measuring the thickness d of a transparent layer, comprising a light source;
a spectrometer system;
an imaging system;
a photodetector, configured for spectral reflectance measurements on the layer; and
the electronic device configured to perform the determining and performing steps of the method according to claim 1 based on detected reflectance measurement data.

9. A method for wet-chemical transparent layer thinning in a manufacturing process, including:

using a spectrometer system and/or an imaging system to obtain a spectral reflectance measurement for the transparent layer;

determining, by an electronic device, an approximate thickness $d_{FFT}$ of the transparent layer based on a precisely known dispersion $n(\lambda)$ of a material of the transparent layer by performing Fast Fourier Transformation, FFT, analysis on Fabry-Pérot oscillation, FPO, in the spectral reflectance measurement;

performing, by the electronic device, a FPO full-spectral fitting procedure with the approximated thickness $d_{FFT}$ as starting value doo to determine an initial local best fitting thickness $d_{FPO,0}$, wherein the FPO full-spectral fitting procedure includes determining the thickness difference $\Delta d_{fit}$ between the initial local best fitting thickness $d_{FPO,0}$ and the approximate thickness $d_{FFT}$, or between neighboring local best FPO fitting results;

repetitively performing the FPO full-spectral fitting procedure with the approximate thickness $d_{FFT}$ shifted by a limited set of integer multiples of the thickness difference $\Delta d_{fit}$ as alternative starting values $d_{0,i}$ to determine a global best fitting thickness $d_{FPO}$, or repetitively performing the FPO full-spectral fitting procedure with the initial local best fitting thickness $d_{FPO,0}$ shifted by a limited set of integer multiples of the thickness difference $\Delta d_{fit}$ as alternative starting values $d_{0,i}$ to determine a global best fitting thickness $d_{FPO}$; and using the global best fitting thickness $d_{FPO}$ to stop the wet-chemical transparent layer thinning at a predetermined thickness corresponding to the global best fitting thickness $d_{FPO}$.

*   *   *   *   *